United States Patent
Houtman et al.

(10) Patent No.: US 10,166,954 B2
(45) Date of Patent: Jan. 1, 2019

(54) BRAKE-BY-WIRE SYSTEM FOR A VEHICLE WITH AN ADJUSTABLE BRAKE PEDAL EMULATOR ASSEMBLY

(71) Applicant: GM GLOBAL TECHNOLOGY OPERATIONS LLC, Detroit, MI (US)

(72) Inventors: Alan J. Houtman, Milford, MI (US); Brandon C. Pennala, Howell, MI (US); Paul A. Kilmurray, Wixom, MI (US); Eric E. Krueger, Chelsea, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/198,517

(22) Filed: Jun. 30, 2016

(65) Prior Publication Data

US 2018/0001875 A1    Jan. 4, 2018

(51) Int. Cl.
*B60T 13/74* (2006.01)
*B60T 7/04* (2006.01)
*B60T 8/40* (2006.01)
*B60T 8/32* (2006.01)
*B60T 11/18* (2006.01)

(52) U.S. Cl.
CPC ............ *B60T 7/042* (2013.01); *B60T 8/3255* (2013.01); *B60T 8/4081* (2013.01); *B60T 11/18* (2013.01); *B60T 2270/82* (2013.01)

(58) Field of Classification Search
CPC ........... B60T 7/042; B60T 13/662; B60T 1/10
USPC ...................... 303/3, 15, 20, 114.1
See application file for complete search history.

(56) References Cited

U.S. PATENT DOCUMENTS

| | | | | |
|---|---|---|---|---|
| 6,289,763 B1* | 9/2001 | Rixon | ...................... | G05G 1/38 74/512 |
| 6,360,629 B2* | 3/2002 | Schambre | .............. | G05G 1/405 74/512 |
| 6,367,886 B1* | 4/2002 | Shaw | ...................... | B60T 7/042 188/151 A |
| 8,181,751 B2* | 5/2012 | Kim | ........................ | B60T 17/18 188/72.2 |
| 9,592,811 B2* | 3/2017 | Deng | ...................... | B60T 11/18 |
| 2004/0259687 A1* | 12/2004 | Ritter | ................... | B60K 26/021 477/187 |
| 2008/0265662 A1* | 10/2008 | Karnjate | ................... | B60T 7/06 180/65.27 |
| 2011/0254357 A1* | 10/2011 | Vollert | ...................... | B60T 1/10 303/3 |
| 2011/0297493 A1* | 12/2011 | Vollert | ................... | B60T 7/042 188/106 R |

(Continued)

*Primary Examiner* — Christopher P Schwartz
(74) *Attorney, Agent, or Firm* — Cantor Colburn LLP

(57) ABSTRACT

A brake pedal assembly of a brake-by-wire system of a vehicle includes a support structure, a brake pedal pivotally engaged to the support structure at a first pivot axis, and a brake pedal emulator assembly. The brake pedal emulator assembly extends between and is pivotally engaged to the brake pedal and the support structure at respective second and third pivot axis. The brake pedal emulator assembly includes a brake pedal emulator and an adjustment mechanism aligned along a centerline intersecting the second and third pivot axis. The brake pedal emulator is constructed and arranged to displace axially when the brake pedal is actuated, and the adjustment mechanism is constructed and arranged to adjust axial displacement.

15 Claims, 4 Drawing Sheets

(56) References Cited

U.S. PATENT DOCUMENTS

| | | | | |
|---|---|---|---|---|
| 2012/0007419 A1* | 1/2012 | Sellinger | | B60T 7/042 |
| | | | | 303/15 |
| 2012/0144823 A1* | 6/2012 | Usui | | B60T 13/745 |
| | | | | 60/545 |
| 2013/0047593 A1* | 2/2013 | Weiberle | | B60T 1/10 |
| | | | | 60/327 |
| 2013/0076115 A1* | 3/2013 | Fukushima | | B60T 7/042 |
| | | | | 303/6.01 |
| 2014/0136069 A1* | 5/2014 | Jung | | B60T 13/662 |
| | | | | 701/70 |
| 2014/0361473 A1* | 12/2014 | Ryu | | B60T 7/06 |
| | | | | 267/140.2 |
| 2015/0061362 A1* | 3/2015 | Kikawa | | B60T 7/06 |
| | | | | 303/10 |
| 2015/0375721 A1* | 12/2015 | Lee | | B60T 8/409 |
| | | | | 303/113.4 |
| 2017/0021816 A1* | 1/2017 | Dobberphul | | B60T 13/745 |
| 2017/0050625 A1* | 2/2017 | Kawazu | | B60T 7/04 |
| 2017/0174189 A1* | 6/2017 | Richards | | B60T 7/06 |
| 2018/0043865 A1* | 2/2018 | Pennala | | B60T 7/06 |

* cited by examiner

BRAKE-BY-WIRE SYSTEM FOR A VEHICLE WITH AN ADJUSTABLE BRAKE PEDAL EMULATOR ASSEMBLY

FIELD OF THE INVENTION

The subject invention relates to a vehicle brake-by-wire (BBW) system, and more particularly, to an adjustable brake pedal emulator assembly of the BBW system.

BACKGROUND

Traditional service braking systems of a vehicle are typically hydraulic fluid based systems actuated by a driver depressing a brake pedal that generally actuates a master cylinder. In-turn, the master cylinder pressurizes hydraulic fluid in a series of hydraulic fluid lines routed to respective actuators at brakes located adjacent to each wheel of the vehicle. Such hydraulic braking may be supplemented by a hydraulic modulator assembly that facilitates anti-lock braking, traction control, and vehicle stability augmentation features. The wheel brakes may be primarily operated by the manually actuated master cylinder with supplemental actuation pressure gradients supplied by the hydraulic modulator assembly during anti-lock, traction control, and stability enhancement modes of operation.

When a plunger of the master cylinder is depressed by the brake pedal to actuate the wheel brakes, pedal resistance is encountered by the driver. This resistance may be due to a combination of actual braking forces at the wheels, hydraulic fluid pressure, mechanical resistance within the booster/master cylinder, the force of a return spring acting on the brake pedal, and other factors. Consequently, a driver is accustomed to and expects to feel this resistance as a normal occurrence during operation of the vehicle. Unfortunately, the 'feel' of conventional brake pedals are not adjustable to meet the desires of a driver.

More recent advancements in braking systems include BBW systems that actuate the vehicle brakes via an electric signal typically generated by an on-board controller. A brake force or torque may be applied to the wheel brakes without a direct hydraulic link to the brake pedal. The BBW system may be an add-on, (i.e., and/or replace a portion of the more conventional hydraulic brake systems), or may completely replace the hydraulic brake system (i.e., a pure BBW system). In either type of BBW system, the brake pedal 'feel', which a driver is accustomed to, must be emulated.

Accordingly, it is desirable to provide a brake pedal emulator that may simulate the brake pedal 'feel' of more conventional brake systems, and may further be compatible with a means of adjusting brake pedal 'feel' by a driver.

SUMMARY OF THE INVENTION

In one exemplary embodiment of the invention, a brake pedal assembly of a BBW system of a vehicle includes a support structure, a brake pedal pivotally engaged to the support structure at a first pivot axis, and a brake pedal emulator assembly. The brake pedal emulator assembly extends between and is pivotally engaged to the brake pedal and the support structure at respective second and third pivot axis. The brake pedal emulator assembly includes a brake pedal emulator and an adjustment mechanism aligned along a centerline intersecting the second and third pivot axis. The brake pedal emulator is constructed and arranged to displace axially when the brake pedal is actuated, and the adjustment mechanism is constructed and arranged to adjust axial displacement.

In another exemplary embodiment of the invention, a BBW system for a vehicle includes a brake assembly, a support structure, a brake pedal pivotally engaged to the support structure at a first pivot axis, and a brake pedal emulator pivotally engaged to the brake pedal at a second pivot axis. An adjustment mechanism of the BBW system is operably coupled to the brake pedal emulator and is pivotally engaged to the support structure at a third pivot axis. The adjustment mechanism is configured to adjust an allowable displacement distance of the brake pedal emulator for adjusting brake pedal firmness.

In another exemplary embodiment of the invention, a method of operating a BBW system includes the detection of a condition by a computer-based controller. Once the condition is detected, an adjustment mechanism of a brake pedal emulator assembly is initiated to alter brake pedal firmness thereby alerting a driver of the condition.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
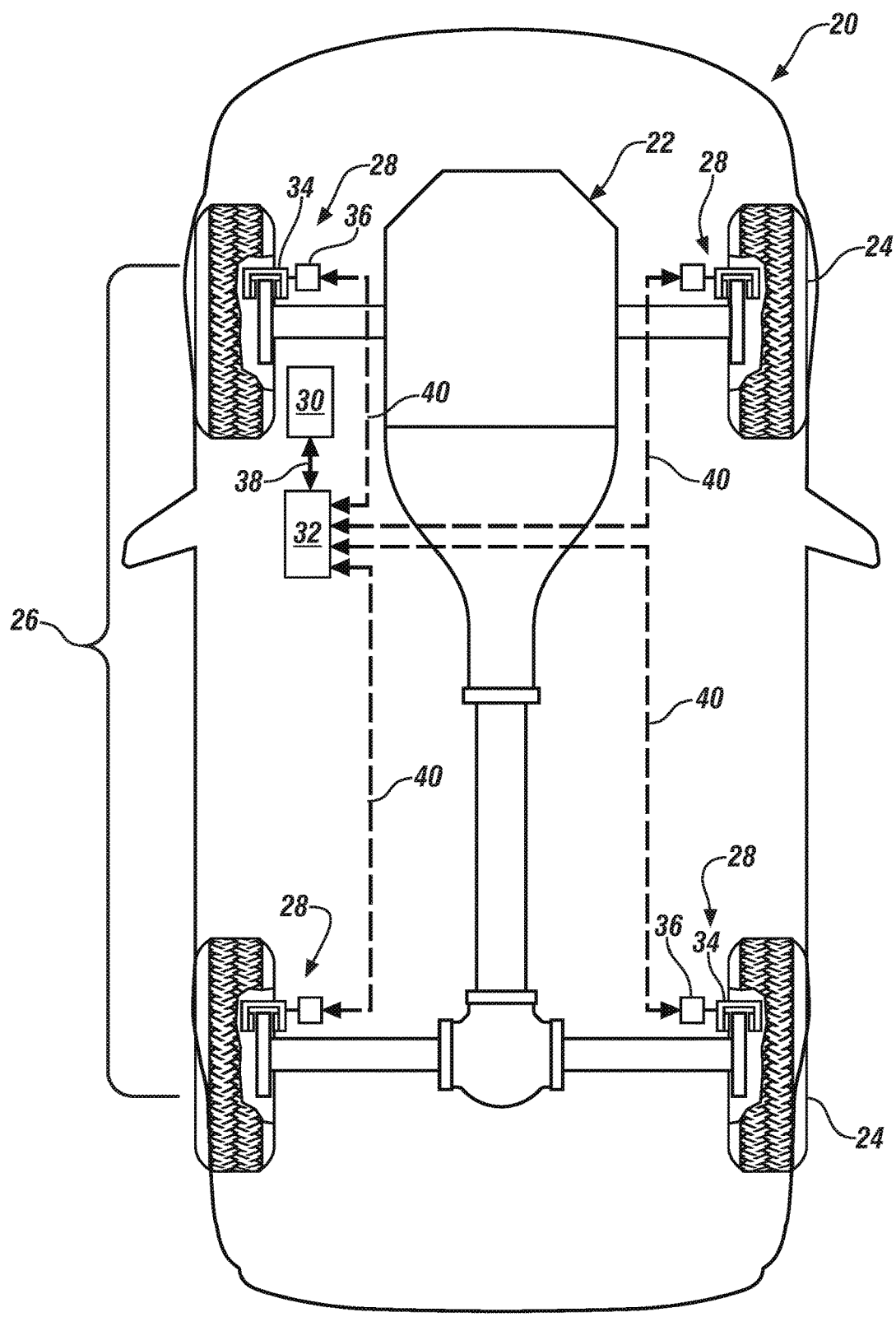
FIG. 1 is a schematic plan view of a vehicle having a BBW system as one non-limiting example in accordance with the present disclosure.

The following description is merely exemplary in nature and is not intended to limit the present disclosure, its application or uses. It should be understood that throughout the drawings, corresponding reference numerals indicate like or corresponding parts and features. As used herein, the terms module and controller refer to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

In accordance with an exemplary embodiment of the invention, FIG. 1 is a schematic of a vehicle 20 that may include a powertrain 22 (i.e., an engine, transmission, and differential), a plurality of rotating wheels 24 (i.e., four illustrated), and a braking system 26 that may be a BBW system as one, non-limiting, example. The BBW system 26 may include a brake assembly 28 for each respective wheel 24, a brake pedal assembly 30, and a controller 32. The powertrain 22 is adapted to drive at least one of the wheels 24 thereby propelling the vehicle 20 upon a surface (e.g., road). The BBW system 26 is configured to generally slow the speed and/or stop motion of the vehicle 20. The vehicle 20 may be an automobile, truck, van, sport utility vehicle, or any other self-propelled or towed conveyance suitable for transporting a burden.

Each brake assembly 28 of the BBW system 26 may include a brake 34 and an actuator 36 configured to operate the brake. The brake 34 may include a caliper and may be any type of brake including disc brakes, drum brakes, and others. As non-limiting examples, the actuator 36 may be an electro-hydraulic brake actuator (EHBA) or other actuators capable of actuating the brake 34 based on an electrical input signal that may be received from the controller 32. More specifically, the actuator 36 may be, or may include, any type of motor capable of acting upon a received electric signal and as a consequence, converting energy into motion that controls movement of the brake 34. Thus, the actuator 36 may be a direct current motor configured to generate electro-hydraulic pressure delivered to, for example, the calipers of the brake 34.

The controller 32 may include a computer-based processor (e.g., microprocessor) and a computer readable and writeable storage medium. In operation, the controller 32 may receive one or more electrical signals from the brake pedal assembly 30 over a pathway (see arrow 38) indicative of driver braking intent. In-turn, the controller 32 may process such signals, and based at least in-part on those signals, output an electrical command signal to the actuators 36 over a pathway (see arrow 40). Based on any variety of vehicle conditions, the command signals directed to each wheel 24 may be the same or may be distinct signals for each wheel 24. The pathways 38, 40 may be wired pathways, wireless pathways, or a combination of both.

Non-limiting examples of the controller 32 may include an arithmetic logic unit that performs arithmetic and logical operations; an electronic control unit that extracts, decodes, and executes instructions from a memory; and, an array unit that utilizes multiple parallel computing elements. Other examples of the controller 32 may include an engine control module, and an application specific integrated circuit. It is further contemplated and understood that the controller 32 may include redundant controllers, and/or the system may include other redundancies, to improve reliability of the BBW system 26.

Figure 2:
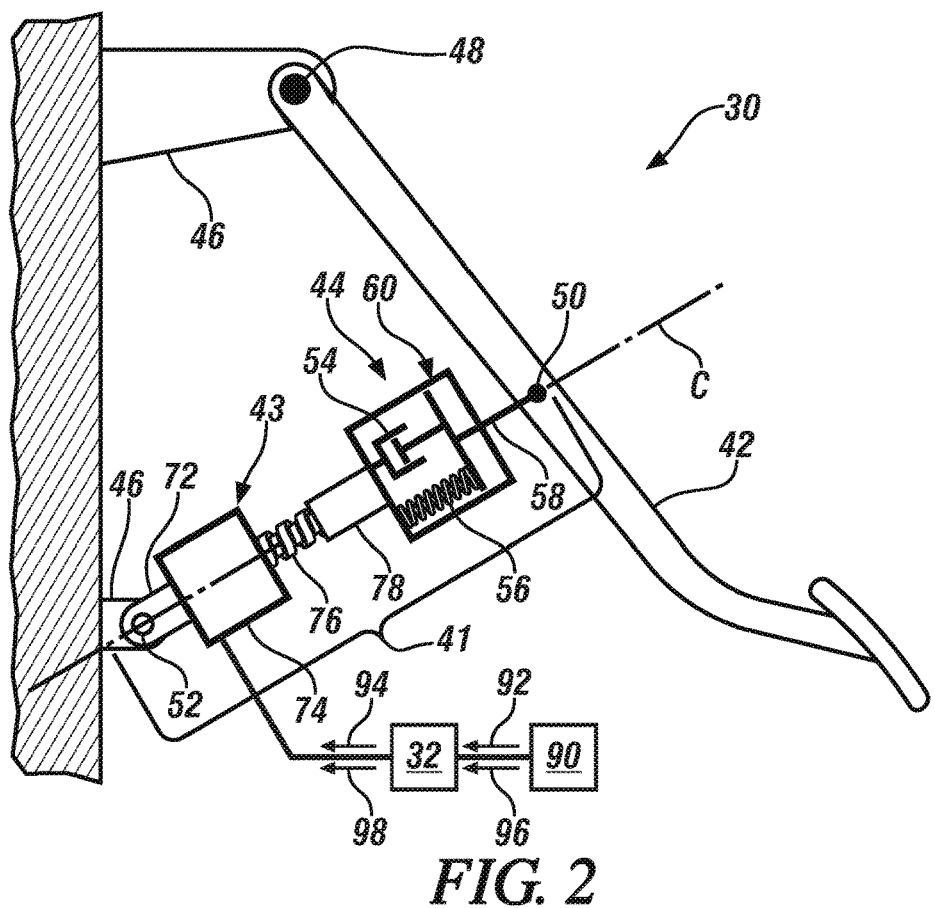
FIG. 2 is a schematic of a brake pedal emulator assembly of the BBW system.

Referring to FIG. 2, the brake pedal assembly 30 of the braking system 26 may include a brake pedal 42 configured to be actuated by a driver for operating the brake assemblies 28 and a brake pedal emulator assembly 41 adapted to adjust and simulate more traditional brake pedal 'feel' to the desire of the driver. The brake pedal 42 may be supported by, and in moving relationship too, a fixed or stationary support structure 46. Illustrated as one non-limiting example, the brake pedal 42 may be pivotally engaged to the fixed structure 46 about a first pivot axis 48. The brake pedal emulator assembly 41 extends between the brake pedal 42 and the support structure 46 at respective second pivot axis 50 and third pivot axis 52. The pivot axes 48, 50, 52 may be substantially parallel to, and spaced from one-another.

The brake pedal emulator assembly 41 may include an adjustment mechanism 43 and a brake pedal emulator 44 generally orientated along a centerline C that may intersect the second and third pivot axes 50, 52. The adjustment mechanism 43 is adapted to adjust the 'firmness' of the brake pedal 'feel', and may extend between the stationary structure 46 at the third pivot axis 52 and the brake pedal emulator 44. The brake pedal emulator 44 is configured to simulate the behavior and/or 'feel' of a more traditional hydraulic braking system, and may extend between the adjustment mechanism 43 and the brake pedal 42 at the second pivot axis 50.

Figure 3:
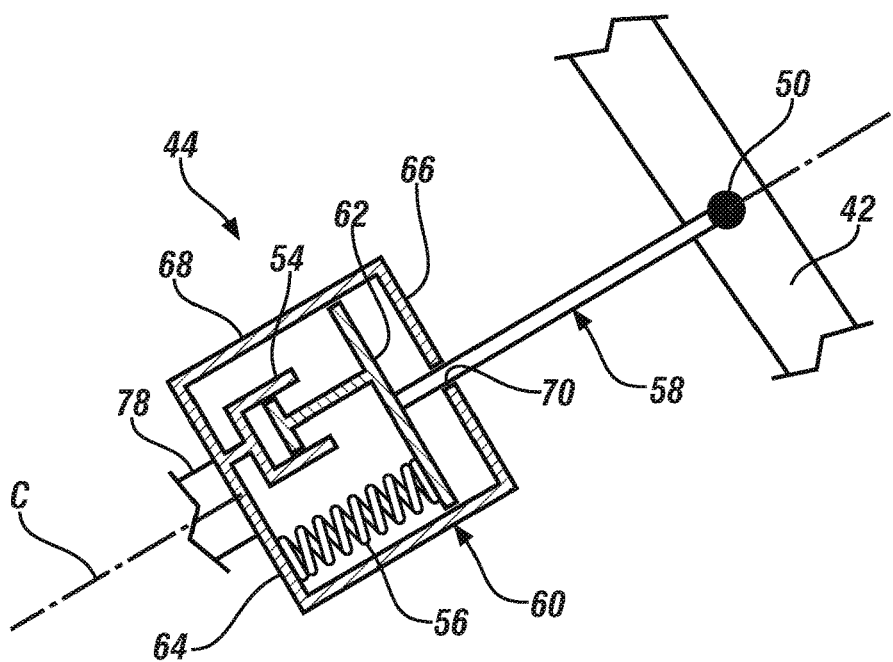
FIG. 3 is a schematic of a brake pedal emulator of the brake pedal emulator assembly.

Referring to FIGS. 2 and 3, the brake pedal emulator 44 of the brake pedal emulator assembly 41 is configured to simulate the behavior and/or 'feel' of a more traditional hydraulic braking system, and may include a damping device 54, a force induction device 56, a linking member 58, and a housing 60. The damping device 54 is constructed and arranged to generally produce a damping force that is a function of the speed upon which a driver depresses the brake pedal 42. The force induction device 56 produces an induced force (e.g., spring force) that is a function of brake pedal displacement. At one end portion, the linking member 58 may be pivotally engaged directly to the brake pedal 42 at the second pivot axis 50. An opposite end portion 62 of the linking member 58 may be enlarged, and may bear directly upon the damping and force induction devices 54, 56. The force induction device 56 may also facilitate the return of the brake pedal 42 after the brake pedal is actuated and release by the driver.

The housing 60 of the brake pedal emulator 44 may include a bottom plate 64, a stop or top plate 66, and a wall 68 engaged to and extending axially between the bottom plate 64 and stop 66. The bottom plate 62 of the brake pedal emulator 44 may axially oppose the enlarged end portion 62 of the linking member 58. The damping and force induction devices 54, 56 are disposed axially between the bottom plate 62 and the enlarged end portion 62 of the linking member 58 for axial compression as the brake pedal 42 is actuated by a driver. The enlarged end portion 62 is disposed axially between the stop 66 of the housing 60 and the devices 54, 56. When the devices 54, 56 are fully extended axially (i.e., the brake pedal 42 is in an un-actuated state), the enlarged head portion 62 may be biased against the stop 66 of the housing 60 by, for example, an axial force exerted by the force induction device 56. The wall 68 may be circumferentially continuous with respect to centerline C, thus wrapping about and encapsulating one or both of the devices 54, 56. Alternatively, the devices 54, 56 may include their own housings and the wall 68 may generally function to consistently axially space the bottom plate 64 from the opposing stop 66. The stop or top plate 66 may generally cover one or both of the devices 54, 56, and may contain opening 70 through which the linking member 58 extends (i.e., in a moving and sealable relationship with the top plate 66). It is contemplated and understood that the spring and the damping device may also be packaged in a coaxial fashion and in a single housing.

One example of the force induction device 56 may be a resiliently compressible, coiled, spring (as illustrated) having opposite ends that bear upon the opposing bottom plate 64 and stop 66 of the housing 60. Other non-limiting examples of a force induction device 56 include an elastomeric foam, a wave spring, and any other device capable of producing a variable force generally as a function of brake pedal displacement. One example of the damping device 54 may include a hydraulic cylinder having at least one internal orifice for the flow and exchange of hydraulic fluid between chambers. Such a damping device (and others) may be designed to exert a constant force when a constant speed is applied to the brake pedal throughout the brake pedal throw. One example of such a 'constant force' damping device 54 may be a hydraulic cylinder with a single orifice. Another non-limiting example of a damping device 54 may include a device designed to increase a force with increasing pedal displacement and when the brake pedal 42 is depressed at a constant speed. Such 'variable force' damping devices may be passive and dependent solely upon the brake pedal position and/or displacement, or may be active and controllable by the controller 32. One example of a 'passive variable force' damping device may include a hydraulic cylinder with multiple orifices individually exposed depending upon the brake pedal position. Other non-limiting examples of a damping device 54 may include a friction damper, an active ball-screw device driven by a controller that also senses pedal position and speed (i.e., ball screw acts as a damping device), and any other device capable of producing a variable force generally as a function of pedal actuation speed. Although illustrated in a parallel (i.e., side-by-side) relationship to one-another, it is further contemplated and understood that the orientation of the devices 54, 56 with respect to one-another may take any variety of forms. For example, the devices 54, 56 may be concentric to one-another about a common centerline C.

The adjustment mechanism 43 of the brake pedal emulator assembly 41 is configured to adjust the firmness of the brake pedal 'feel' to the desire of the driver. The firmness adjustment may be considered an indirect means of adjusting the effects of the force induction device 56. The adjustment mechanism 43 may be a ball-screw device, and may include a base member 72, an electric motor 74, a threaded rod 76, and a carriage 78 that may include female threads. The base member 72 may be directly engaged pivotally to the support structure 46 at the third pivot axis 52. The electric motor 74 may be supported by and engaged to the base member 72. The threaded rod 76 is operably coupled to the electric motor 74 for rotation about a rotation axis (not shown) that may co-extend with the centerline C. The carriage 78 is threaded upon the threaded rod 76 for axial movement with reference to the rotation axis (i.e., centerline C) when the electric motor 74 rotates the threaded rod 76. The carriage 78 is mechanically coupled to the brake pedal emulator 44 to prevent or limit rotation about the rotation axis as the threaded rod 76 rotates. More specifically, the carriage 78 may be rigidly connected to a side of the bottom plate 64 of the housing 60 that is opposite a side of the bottom plate 64 upon which the devices 54, 56 are seated.

Figure 4:
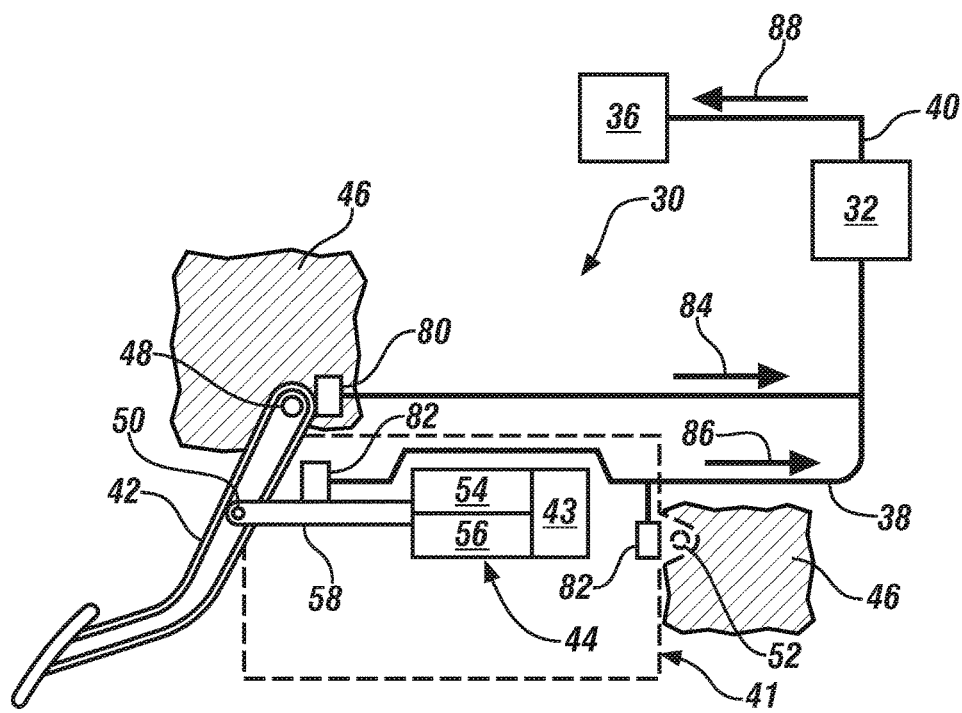
FIG. 4 is a schematic of the BBW system.

Referring to FIG. 4, the brake pedal emulator assembly 41 of the brake pedal assembly 30 may further include at least one displacement sensor 80 configured to measure displacement (e.g., linear, angular, and others) of, for example, brake pedal 42 (i.e., proximate to pivot axis 48). The brake pedal emulator assembly 41 may further include at least one pressure (i.e., force) sensor 82 that may be orientated at one or both sides of the emulator 44 proximate to the pivot axes 50, 52 to measure applied pressure. To optimize system reliability, the brake pedal emulator assembly 41 may include more than one displacement sensor located at different locations of the brake pedal assembly 30. Similarly, the brake pedal emulator assembly 41 may include more than one pressure sensor (i.e., force) configured to, for example, output redundant signals to more than one controller to optimize sensor robustness.

In operation, the controller 32 is configured to receive a displacement signal (see arrow 84) and a pressure signal (see arrow 86) over pathway 38 and from the respective sensors 80, 82 as the brake pedal 42 is actuated by a driver. The controller 32 processes the displacement and pressure signals 84, 86 then sends appropriate command signal(s) 88 to the brake actuators 36 of the brake assemblies 28 over the pathway 40.

Referring to FIG. 2, the adjustment mechanism 43 may be initiated by a driver utilizing a human-machine interface (HMI) 90. The HMI 90 may be configured to provide a driver with the option of a softer or firmer brake pedal feel, and may be any variety of interfaces including switches and interactive touch screens. In operation, if a driver desires a firmer brake pedal feel, the driver may interact with the HMI 90 and the HMI 90 may accordingly output a command signal (see arrow 92) to the controller 32. In response, the controller 32 may output an initiation signal (see arrow 94) to the motor 74 causing the motor to rotate in a first direction that moves the carriage 78 away from pivot axis 52 thereby decreasing an allowable displacement distance that the devices 54, 56 may travel. By decreasing the allowable displacement distance (and increasing the spring preload, and changing position dependent damping characteristics), the firmness of the brake pedal feel is increased, and the brake pedal travel may decrease or generally remain constant. Similarly, if the driver desires a softer brake pedal feel, the driver may interact with the HMI 90 and the HMI 90 may accordingly output a command signal (see arrow 96) to the controller 32. In response, the controller 32 may output an initiation signal (see arrow 98) to the motor 74 causing the motor to rotate in an opposite second direction that moves the carriage 78 toward the pivot axis 52 thereby increasing the allowable displacement distance (and decreasing the spring preload, and changing position dependent damping characteristics) of the devices 54, 56. By increasing the allowable displacement distance, the firmness of the brake pedal feel is decreased, and the brake pedal travel may increase or generally remain constant.

Figure 5:
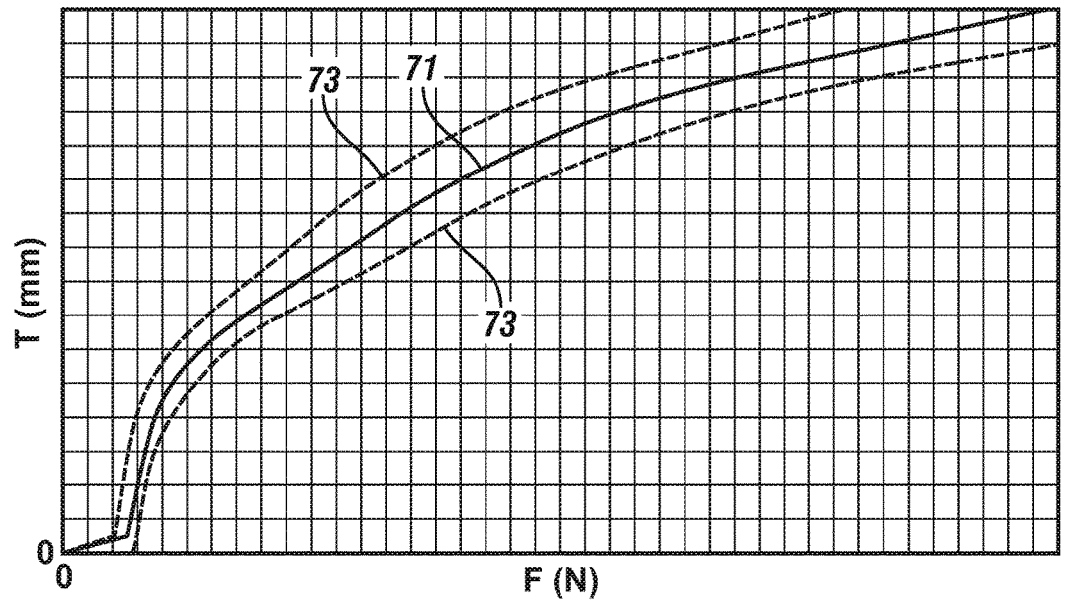
FIG. 5 is a graph of a force profile of a force induction device of the BBW system as a function of brake pedal travel.

Referring to FIG. 5, one example of a force profile of the force induction device 56 is generally illustrated as a function of brake pedal travel T, illustrated in the graph as driver applied brake pedal force F verse the brake pedal travel T. The solid arcuate or curved line 71 represents the targeted profile, and the dashed lines 73 represent the outer bounds (i.e., tolerance) of the targeted profile. The force induction device 56 may be designed to meet this targeted profile 71.

Figure 6:
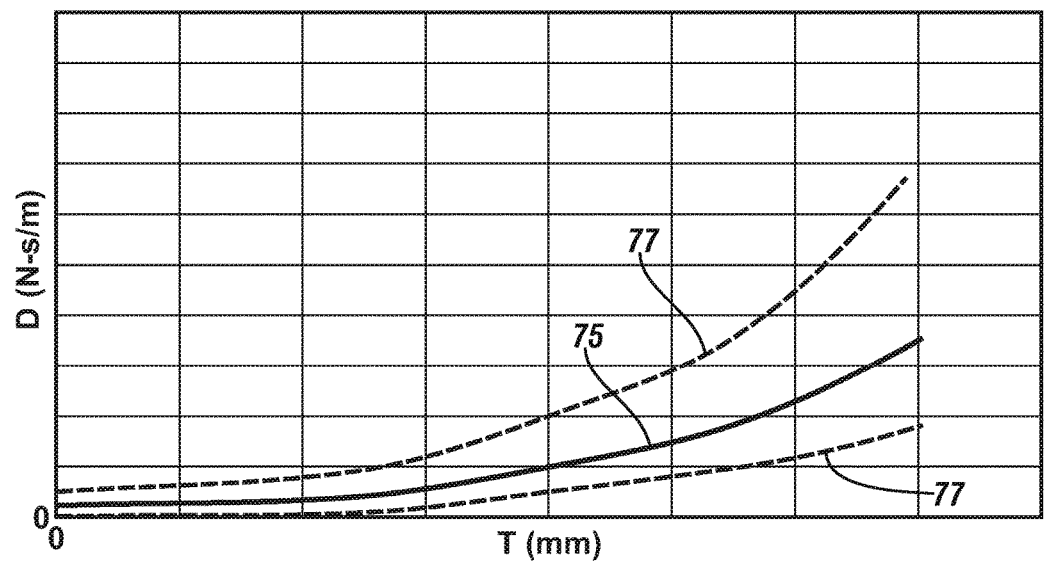
FIG. 6 is a graph depicting a damping coefficient profile of a damping device of the BBW system as a function of brake pedal travel.

Referring to FIG. 6, one example of a damping coefficient profile is generally illustrated as a function of brake pedal travel T, illustrated in the graph as the brake pedal travel T verse a damping coefficient D. The solid curved line 75 represents the targeted profile, and the dashed lines 77 represent the outer bounds (i.e., tolerance) of the targeted profile. Similar to the force induction device 56, the damping device 54 may be designed to meet this targeted profile. It is further contemplated and understood that the data from the targeted force and damping force profiles along with pre-established target tolerances (i.e., bounds) may be programmed into the controller 32 for various processing functions. Although not specifically illustrated, it is further contemplated and understood that to various degrees, one or both of the devices 54, 56 may be adjustable with this adjustability being controlled by the controller 32 to, for example, meet the pre-programmed profiles of FIGS. 5 and 6. It is further noted that the damping coefficient D is a function of pedal position, and the damping force is a function of pedal apply rate and pedal position.

Figure 7:
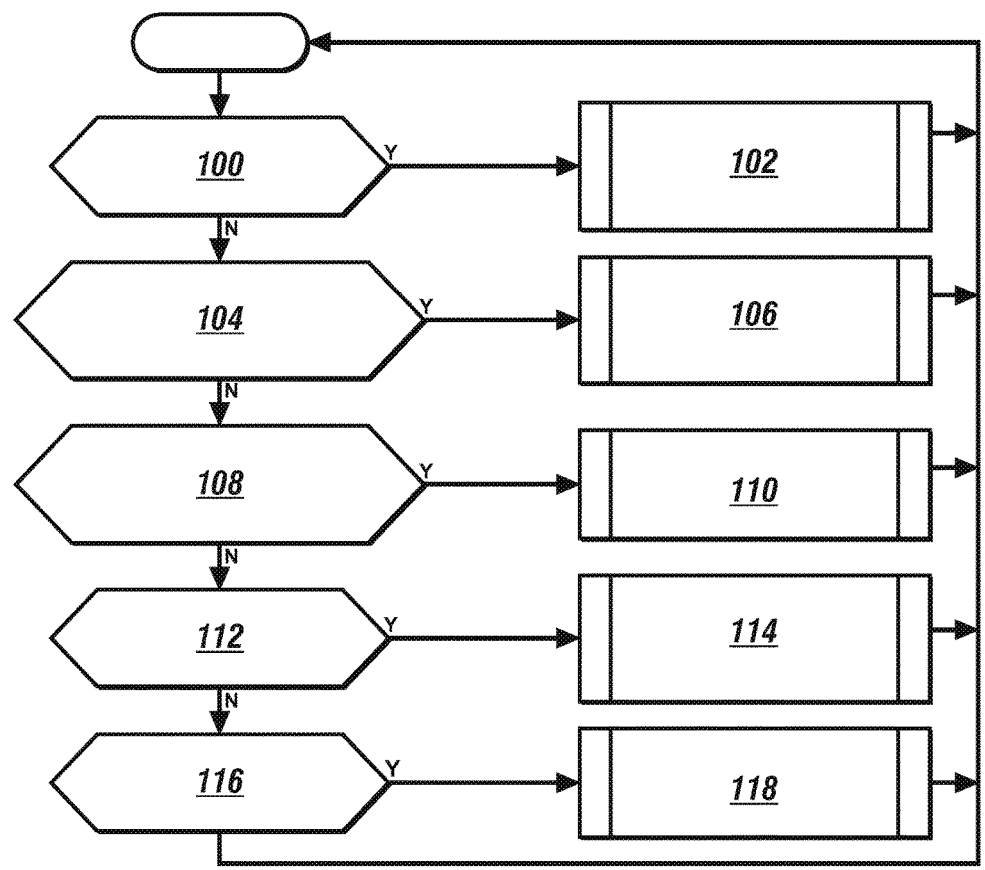
FIG. 7 is a flow chart of a method of operating the BBW system.

In addition to providing an adjustable, desired, brake pedal feel for a driver, the adjustment mechanism 43 of the brake pedal emulator assembly 41 may be adapted to provide an automated brake pedal feel designed to alert the driver of any variety of vehicle conditions and/or simulate a brake system fault condition that one may typically expect to feel in more traditional, hydraulic, brake systems. Referring to FIG. 7, one method of operation of the BBW system 26 is illustrated. For example and per block 100, the system 26 may monitor for a fault (e.g., degraded brake actuator). Per block 102, if a fault is detected, the controller 32 may initiate the adjustment mechanism 43 to reduce preload of the emulator 44 to a minimum value thus producing a soft pedal feel.

Per block 104, if a fault is not detected, the system 26 may monitor for a rotor thickness variation. Per block 106, if a rotor thickness variation is detected, the controller 32 may initiate the adjustment mechanism 43 to modulate the motor position at a frequency that may be based on deceleration oscillation frequency.

Per block 108, if a rotor thickness variation is not detected, the system 26 may monitor for boiling brake fluid (i.e., high temperature and degrading pressure-volume (PV) curve). Per block 110, if boiling brake fluid is detected, the controller 32 may initiate the adjustment mechanism 43 to reduce preload of the emulator 44 to a minimum value thus producing a soft pedal feel.

Per block 112, if boiling brake fluid is not detected, the system 26 may monitor for an active ABS. Per block 114, if an active ABS is detected, the controller 32 may initiate the adjustment mechanism to modulate the motor position (i.e. frequency based on ABS cycling frequency), thus modulating the brake pedal feel. Other examples that may modulate the motor position, may include a force based on instantaneous system volume (i.e., pressure) estimation, or, calibrated frequency for haptic pedal feedback.

Per block 116, if an active ABS is not detected, the system 26 may monitor for driver mode changes (e.g., preprogrammed brake feels for specific drivers, etc.). Per block 118, if a driver mode change is detected, the controller 32 may initiated the adjustment mechanism to adjust the preloading of the emulator 44 to, for example, pre-programmed values (e.g., sport/firm, tour/soft, etc.).

It is further contemplated and understood that the conditions may be pre-programmed into the controller 32, and the system 26 may monitor all the pre-programmed conditions described above in unison and/or in different order than provided. It is also understood that the system 26 may monitor conditions not directly related to the braking system and may, none-the-less, adjust the firmness of the brake pedal 42 for the purpose of alerting the driver of a detected condition.

Advantages and benefits of the present disclosure include the ability of a driver to select brake pedal firmness and aggressiveness. Other advantages include the ability to correlate such selected brake pedal firmness with a brake pedal emulator of a BBW system which includes the ability to simulate brake pedal damping and other forces similar to more traditional brake systems. Other advantages may include the ability to alert a driver of a vehicle condition through an automated change in brake pedal feel. Yet further, the present disclosure enables a compact mechanical part envelope that simplifies design and physical integration of a pedal module, along with simplifying diagnosis and servicing of the module.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A brake pedal assembly comprising:
a support structure;
a brake pedal pivotally engaged to the support structure at a first pivot axis; and
a brake pedal emulator assembly extending between and pivotally engaged to the brake pedal and the support structure at respective second and third pivot axis, the brake pedal emulator assembly including a brake pedal emulator and an adjustment mechanism aligned along a centerline intersecting the second and third pivot axis, and wherein the brake pedal emulator is constructed and arranged to displace axially when the brake pedal is actuated and the adjustment mechanism is constructed and arranged to adjust axial displacement, wherein the adjustment mechanism includes a threaded rod constructed and arranged to rotate about the centerline and a carriage threadably coupled to the threaded rod for axial movement along the centerline and engaged to the brake pedal emulator.

2. The brake pedal assembly set forth in claim 1, wherein the adjustment mechanism includes a base member pivotally engaged to the support structure at the third pivot axis and an electric motor engaged to the base member and configured to rotate the threaded rod.

3. The brake pedal assembly set forth in claim 2, wherein the brake pedal emulator includes a force induction device constructed and arranged to exert a first force upon the brake pedal that varies as a function of brake pedal travel.

4. The brake pedal assembly set forth in claim 3, wherein the force induction device is resiliently compressed between a linking member of the brake pedal emulator assembly engaged to the brake pedal at the second pivot axis and the carriage.

5. The brake pedal assembly set forth in claim 4, wherein the brake pedal emulator includes a damping device constructed and arranged to exert a second force upon the linking member that varies as a function of at least brake pedal speed.

6. The brake pedal assembly set forth in claim 5, wherein the second force is exerted between the linking member and the carriage.

7. The brake pedal assembly set forth in claim 6, wherein the damping device is a hydraulic cylinder.

8. The brake pedal assembly set forth in claim 4, wherein the force induction device is a compressible coiled spring.

9. The brake pedal assembly set forth in claim 3, wherein the brake pedal emulator includes a damping device constructed and arranged to exert a second force upon the brake pedal that varies as a function of at least brake pedal speed.

10. The brake pedal assembly set forth in claim 1, wherein the adjustment mechanism is a ball-screw device.

11. The BBW system set forth in claim 10, wherein the allowable displacement distance is measured along a centerline that intersects the second and third pivot axis.

12. The BBW system set forth in claim 11 further comprising:
a computer-based controller configured to operate the adjustment mechanism.

13. The BBW system set forth in claim 12 further comprising:
a human-machine interface configured to send an electric signal to the controller for actuation of the adjustment mechanism.

14. The BBW system set forth in claim 13, wherein the brake pedal emulator includes a damping device constructed and arranged to exert a first force upon the brake pedal that varies as a function of brake pedal speed, and a force induction device constructed and arranged to exert a second force upon the brake pedal that varies as a function of brake pedal displacement.

15. A brake-by-wire (BBW) system for a vehicle comprising:
a brake assembly;
a support structure;
a brake pedal pivotally engaged to the support structure at a first pivot axis;
a brake pedal emulator pivotally engaged to the brake pedal at a second pivot axis; and
an adjustment mechanism operably coupled to the brake pedal emulator and pivotally engaged to the support structure at a third pivot axis, and wherein the adjustment mechanism is configured to adjust an allowable displacement distance of the brake pedal emulator for adjusting brake pedal firmness.

\* \* \* \* \*